United States Patent [19]

Mehrgardt et al.

[11] Patent Number: 4,760,542

[45] Date of Patent: Jul. 26, 1988

[54] DELAY CIRCUIT FOR DIGITAL SIGNALS

[75] Inventors: Soenke Mehrgardt, March-Neuershausen; Rainer Schweer, Waldkirch, both of Fed. Rep. of Germany

[73] Assignee: Deutsche ITT Industries GmbH, Freiburg, Fed. Rep. of Germany

[21] Appl. No.: 795,081

[22] Filed: Nov. 5, 1985

[30] Foreign Application Priority Data

Nov. 16, 1984 [EP] European Pat. Off. ........ 84113894.4

[51] Int. Cl.⁴ .................................................. G06F 7/38
[52] U.S. Cl. ..................................... 364/724; 364/715
[58] Field of Search ................. 364/724, 715; 333/18; 375/17–18

[56] References Cited

U.S. PATENT DOCUMENTS

| | | | |
|---|---|---|---|
| 3,521,041 | 7/1970 | Blerkom et al. | 364/724 |
| 3,943,346 | 3/1976 | Urkowitz et al. | 364/724 |
| 4,044,241 | 8/1977 | Hatley, Jr. | 364/724 |
| 4,074,308 | 2/1978 | Gibson | 358/38 |
| 4,472,785 | 9/1984 | Kasupa | 364/718 |
| 4,531,221 | 7/1985 | Chung et al. | 364/724 |
| 4,542,475 | 9/1985 | Acampora | 364/724 |
| 4,584,600 | 4/1986 | Baker | 364/724 |
| 4,649,507 | 3/1987 | Inaba et al. | 364/724 |

FOREIGN PATENT DOCUMENTS 0022642  1/1982  European Pat. Off. .
2078406  1/1982  United Kingdom .

OTHER PUBLICATIONS

Rossi, "Digital Television Image Enhencement", Journal of the Society of Motion Picture & Television Engineers, vol. 84, No. 7, Jul. 1975, pp. 545–551.

Primary Examiner—Gary V. Harkcom
Assistant Examiner—Tan V. Mai
Attorney, Agent, or Firm—T. L. Peterson

[57] ABSTRACT

A digital delay arrangement generates a delay time which is a noninteger multiple of the period of a system clock frequency. The arrangement includes a digital delay circuit having a delay time equal to the period, a multiplier for the part of the noninteger multiplier, b, being less than one, a further multiplier for 1—b, an adder and a peaking filter clocked by the system clock.

3 Claims, 1 Drawing Sheet

DELAY CIRCUIT FOR DIGITAL SIGNALS

BACKGROUND OF THE INVENTION

The invention pertains to a digital delay circuit.

More specifically, the present invention relates to a delay circuit for digital signals which are formed from a band-limited analog signal by means of an analog-to-digital converter clocked by a sampling signal of fixed frequency, and which are to be delayed by a selectable nonintegral multiple of the sampling period in a digital circuit system clocked by the sampling signal.

In digital circuit systems processing digital signals under control of a fixed-frequency clock signal, which may be identical with the clock signal of the analog-to-digital converter producing the digital signals from an analog signal, the shortest possible delay that can be realized by simple means is the sampling period. If, in such a system, delays shorter than the sampling period or nonintegral multiples thereof are to be generated, which is necessary, for example, when interpolating digital signals, the digital signals must be delayed by means of a delay circuit specifically designed for this purpose if it is impossible to increase the frequency of the clock signal so as to achieve shorter delays as a result of the shorter sampling period.

SUMMARY OF THE INVENTION

In accordance with the invention a circuit system controlled by a clock signal of fixed frequency includes a delay circuit for digital signals which influences the digital signals so that they appear with a delay equal to a selectable nonintegral multiple of the sampling period. Furthermore, both the amplitude- and phase-frequency responses of the delay circuit are chosen to be optimal. Simultaneous optimization of both frequency responses is likely to succeed only in exceptional cases, but, depending on the application, a trade-off of the optimization of either of the two frequency responses for the optimization of the other is sufficient within the spirit of the invention.

BRIEF DESCRIPTION OF THE DRAWING

The invention will be better understood from a reading of the following detailed description in conjunction with the drawing in which.

DETAILED DESCRIPTION

The digital signals ds are formed from a band-limited analog signal by means of an analog-to-digital converter (not shown) clocked by a sampling signal of fixed frequency. Digital signals ds are applied to the first digital delay element v1, which provides a delay v equal to the sampling period. The digital signals so delayed are fed to the first multiplier m1, which follows the first delay element v1 and is also fed with the numerical value of the smaller-than-one part b of the sampling period; by this part b, the digital signals ds are to be delayed, too.

The first delay element v1 and the first multiplier m1 form a first parallel branch. A second parallel branch contains the second multiplier m2, which is presented with the factor 1−b and the digital signals ds. The outputs of the first and second multipliers m1, m2 are respectively connected to the first and second inputs of the first adder a1, whose output is coupled to the input of the digital peaking filter pf. The delayed digital signals ds′ appear at the output of the peaking filter pf, which compensates for the amplitude-frequency response of the subcircuit formed by the two parallel branches and the first adder a1 in the frequency range up to half the sampling frequency. The amplitude-frequency response of this subcircuit has a zero at half the sampling frequency.

Figure 1:
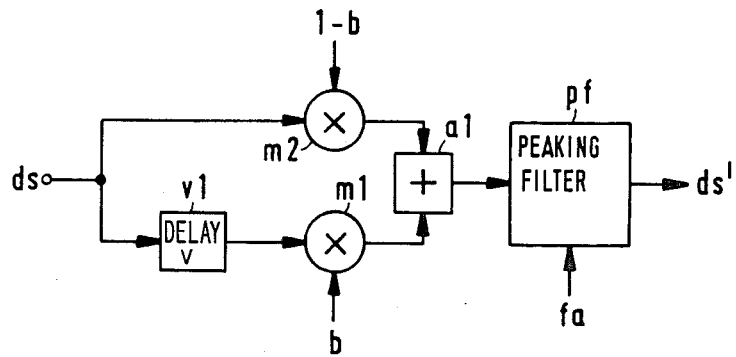
FIG. 1 is a block diagram of an embodiment of the circuit in accordance with the invention.

The delay circuit of FIG. 1 has different phase-frequency responses for different numerical values of the smaller-than-one part b of the nonintegral multiple. This is undesirable in certain applications.

Figure 2:
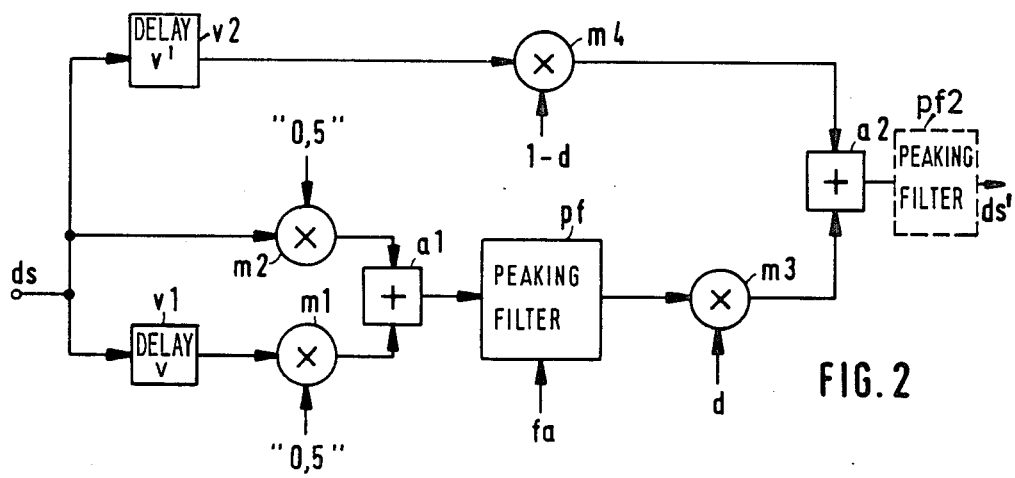
FIG. 2 is a block diagram of a second embodiment of a circuit in accordance with the invention.

The block diagram of FIG. 2 shows an embodiment of a second delay circuit. An arrangement as shown in FIG. 1 is used in which b=0.5, and in which the peaking filter pf is followed by the third multiplier m3, to which the selectable part of the sampling period, which part is now designated d, is applied as the second input signal. Associated with this parallel branch of the arrangement of FIG. 2 is a further parallel branch which, as seen from the input of the overall arrangement, contains the second delay element v2, which provides a delay v′ equal to that integral multiple of the sampling period which is the next smaller or next greater one of the total delay of the delay circuit of FIG. 1 if b=0.5, and the fourth multiplier m4, which has one of its inputs connected to the output of the second delay element v2, while the other input is presented with the factor 1−d. The outputs of the third and fourth multipliers m3 and m4 are respectively connected to the first and second inputs of the second adder a2, which delivers the delayed digital signal ds′. The second adder a2 may be followed by a further peaking filter pf2 shown in dotted lines if required.

Figure 3:
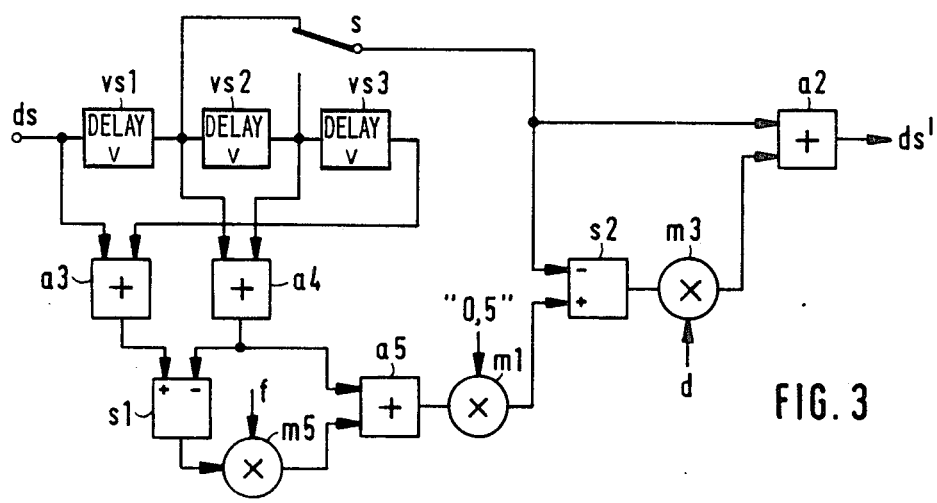
FIG. 3 is a block diagram of a specific arrangement of the circuit of FIG. 2.

FIG. 3 shows a specific arrangement of the embodiment of FIG. 2 for a simple peaking filter with the transfer function $$H(z)=f+(1-2f)z^{-1}+fz^{-2},$$

where z is the complex frequency variable, and f is a coefficient representing the peaking factor, as is well known. In FIG. 3, the first, second, and third delay stages vs1, vs2, vs3, each of which provides the delay v, are cascaded, and the input of the first delay stage vs1 is presented with the digital signal ds. This signal is also applied to the first input of the third adder a3, and the output of the first delay stage vs1 is coupled to the first input of the fourth adder a4, which has its second input connected to the input of the third delay stage vs3. The output of the latter is coupled to the second input of the third adder a3. The output of the third adder a3 is connected to the minuend input, and the output of the fourth adder a4 to the subtrahend input, of the first subtracter s1, whose output is coupled through the fifth multiplier m5 for the peaking factor f to the first input of the fifth adder a5, which has its second input connected to the output of the fourth adder a4. The output of the fifth adder a5 is coupled through the first multiplier m1 to the minuend input of the second subtracter s2, whose subtrahend input is connected to the output of the electronic switch s. The first input of the latter is connected to the output of the first delay stage vs1, and the second input to the output of the second delay stage vs2. The output of the second subtracter s2 is connected to the first input of the second adder a2 via the third multiplier m3, and the output of the electronic switch s is coupled to the second input of this adder. For a circuit delay between v and 1.5·v, the first input of the electronic switch s must be connected to the output of this switch; for 1.5·v to 2·v, the second input must be connected to the output.

The transfer function at the output of the first multiplier m1 is as follows:

$$H'(z) = f + (z^{-1} + z^{-2})(1-f) + z^{-3}f.$$

It can be seen that in the specific embodiment of FIG. 3, the amount of circuitry required is reduced to a minimum, i.e., the functions of some of the subcircuits of FIG. 2 are performed by other subcircuits.

In the figures of the drawing, the interconnecting leads between the individual subcircuits are represented by lines for the sake of simplicity. The interconnections will generally be buses, because parallel signal processing will be used. In this case, the individual subcircuits will be subcircuits suitable for such parallel processing, i.e., parallel adders, parallel multipliers, etc.

The delay circuit in accordance with the invention can be readily implemented using integrated-circuit techniques, and preferably forms part of a larger integrated circuit. As the signals are processed digitally, implementation with insulated-gate field-effect transistor circuits, i.e., MOS technology, is particularly advantageous, but it is also possible to use other integrated-circuit techniques.

What is claimed is:

1. A delay circuit for digital signals which are formed from a band-limited analog signal by means of an analog-to-digital converter clocked by a sampling signal of fixed frequency and which are to be delayed by a nonintegral multiple of the sampling period of a digital circuit system clocked by said sampling signal, said delay circuit comprising:
    a first circuit branch including a first delay element providing a delay equal to the period of said sampling signal, and a following first multiplier for a smaller-than-one part b of said nonintegral multiple, wherein b equals 0.5;
    a second circuit branch including a second multiplier for multiplying said digital signal by a factor of 1−b;
    said first and second circuit branches each receiving said digital signals;
    a first adder having first and second inputs connected to said first and second circuit branches, respectively and having an output;
    a digital peaking filter coupled to said first adder output and clocked by said sampling signal, said filter compensating for the amplitude frequency response of said first and second circuit branches and said first adder in a frequency range up to one half said sampling frequency;
    a third multiplier coupled to the output of said peaking filter for multiplying the output of said peaking filter by a second smaller-than-one part d of said nonintegral multiple;
    a second digital delay element receiving said digital signals and providing a predetermined delay which is an integral multiple of the period of said sampling signal;
    a fourth multiplier coupled to said second digital delay element for multiplying the output thereof by the factor 1−d; and
    a second adder having one input coupled to the output of said fourth multiplier and a second input coupled to the output of said third multiplier.

2. A delay circuit in accordance with claim 1, comprising:
    a second peaking filter coupled to the output of said second adder.

3. A delay circuit for digital signals which are formed from a band limited analog signal by means of an analog-to-digital converter clocked by a sampling signal of fixed frequency and which are to be delayed by a nonintegral multiple of the sampling period of a digital circuit system clocked by said sampling signal, said delay circuit comprising:
    first, second and third serially connected delay stages each having a delay v equal to the period of said sampling signal, said first delay stage receiving said digital signals;
    a first adder having a first input receiving said digital signals, and a second input coupled to the output of said third delay stage;
    a second adder having a first input coupled to the output of said first delay stage, and a second input coupled to the output of said second delay stage;
    a subtracter having its minuend input coupled to the output of said first adder, and its subtrahend input coupled to the output of said second adder;
    a third adder having a first input coupled to said second adder output and having a second input;
    a first multiplier coupling the output of said subtracter to said third adder second input and multiplying the output of said subtracter by a peaking factor;
    an electronic switch having a first input coupled to the output of said first delay stage, a second input coupled to the output of said second delay stage, and an output;
    a second multiplier coupling the output of said third adder to said second subtracter subtrahend input, said second multiplier multiplying the output of said third adder by 0.5;
    a fourth adder having a first input coupled to said electronic switch output, a second input, and an output; and
    a third multiplier coupling the output of said second multiplier to said fourth adder second input, and multiplying the output of said second subtracter by a predetermined factor less than one;
    said electronic switch output being coupled to said first input so that said delay circuit has a total delay in the range between v and 1.5 v, where v is equal to the period of said sampling signal, and said electronic switch output being coupled to said second input for said delay circuit having a total delay greater than 1.5 v through 2.0 v;
    said fourth adder output providing the output for said delay circuit.

* * * * *